(12) United States Patent
McDonald et al.

(10) Patent No.: US 11,645,617 B1
(45) Date of Patent: May 9, 2023

(54) AUTONOMOUS SUPPLY CHAIN BY COLLABORATIVE SOFTWARE AGENTS AND REINFORCEMENT LEARNING

(71) Applicant: Blue Yonder Group, Inc., Scottsdale, AZ (US)

(72) Inventors: Dale Lachlan McDonald, Scottsdale, AZ (US); Felix Christopher Wick, Thaleischweiler-Fröschen (DE)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 17/195,258

(22) Filed: Mar. 8, 2021

Related U.S. Application Data

(60) Provisional application No. 63/002,777, filed on Mar. 31, 2020.

(51) Int. Cl.
*G06Q 10/08* (2023.01)
*G06Q 10/087* (2023.01)
*G06N 20/00* (2019.01)

(52) U.S. Cl.
CPC ........... *G06Q 10/087* (2013.01); *G06N 20/00* (2019.01)

(58) Field of Classification Search
CPC combination set(s) only.
See application file for complete search history.

(56) References Cited

U.S. PATENT DOCUMENTS

| | | | |
|---|---|---|---|
| 2017/0091662 A1* | 3/2017 | Sanchez | G06F 16/2465 |
| 2018/0232646 A1* | 8/2018 | Acharya | G06N 7/01 |
| 2020/0151655 A1* | 5/2020 | Khoche | G06K 19/0723 |

OTHER PUBLICATIONS

Oroojlooyjadid et al., "A Deep Q-Network for the Beer Game: Reinforcement Learning for Inventory Optimization," arXiv: 1708.05924v3 [cs.LG], URL https://arxiv.org/abs/1708.05924v3 [cs.LG], Published Feb. 7, 2019, Accessed Mar. 30, 2020.

* cited by examiner

*Primary Examiner* — Peter Ludwig
*Assistant Examiner* — Reva R Moore
(74) *Attorney, Agent, or Firm* — Spencer Fane LLP; Steven J. Laureanti

(57) ABSTRACT

A system and method are disclosed to train machine learning models, generate software agents, and evaluate, via reinforcement learning, the actions of the software agents in a simulated ecosystem. Embodiments include a computer comprising a processor and memory and configured to train one or more machine learning models to generate one or more software agents, wherein each software agent comprises an autonomous software program designed to execute a task in a supply chain network. Embodiments generate a first software agent and a second software agent, and a simulated supply chain ecosystem representing a hierarchical structure of supply chain network tasks. Embodiments simulate one or more tasks executed by the software agents in the simulated supply chain ecosystem, review the tasks according to one or more defined objectives, and apply reinforcement incentives to the software agents.

20 Claims, 3 Drawing Sheets

AUTONOMOUS SUPPLY CHAIN BY COLLABORATIVE SOFTWARE AGENTS AND REINFORCEMENT LEARNING

CROSS-REFERENCE TO RELATED APPLICATIONS

The present disclosure is related to that disclosed in the U.S. Provisional Application No. 63/002,777, filed Mar. 31, 2020, entitled "Autonomous Supply Chain by Collaborative Software Agents and Reinforcement Learning." U.S. Provisional Application No. 63/002,777 is assigned to the assignee of the present application. The present invention hereby claims priority under 35 U.S.C. § 119(e) to U.S. Provisional Application No. 63/002,777.

TECHNICAL FIELD

The present disclosure relates generally to data processing, and more in particular relates to data processing for a supply chain, consisting of manufacturing, distribution, and retail, using machine learning.

BACKGROUND

Machine learning techniques may generate one or more machine learning models that forecast demand for products sold at one or more retail locations over a defined time period, or that provide other supply chain outputs. To forecast demand, machine learning models may model the influence of exterior causal factors, such as, for example, known holidays, sales promotions, or incoming weather events that may make customer travel to and from a retail location difficult, on historical time series sales data. Machine learning techniques may also generate one or more machine learning models optimized for particular supply chain entities or datasets. Machine learning systems may use one or more trained machine learning models to generate one or more software agents. For the purposes of this disclosure, a software agent comprises an autonomous software program designed to execute a specific supply chain task, including but not limited to forecasting demand, planning routes, ordering replenishments, planning logistics, or executing in-store category management. The optimization of a whole supply chain, i.e. the minimization of long-run, system-wide costs, may correspond to a decentralized, multi-agent, cooperative problem. However, systems and methods that rely only on supervised learning, including but not limited to deep learning, to develop and refine software agents may require significant human input and complex optimization algorithms for subsequent decision making. Conversely, systems and methods that rely only on reinforcement learning, without using demand forecasts as input, to develop and refine decision making by software agents may be incapable of appropriately modeling the complex supply chain ecosystem with its large state and action space in which the software agents operate, and may fail to properly model rewards (positive reinforcement) and penalties (negative reinforcement) applied to one or more software agents to train the software agents to accomplish their stated goals, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
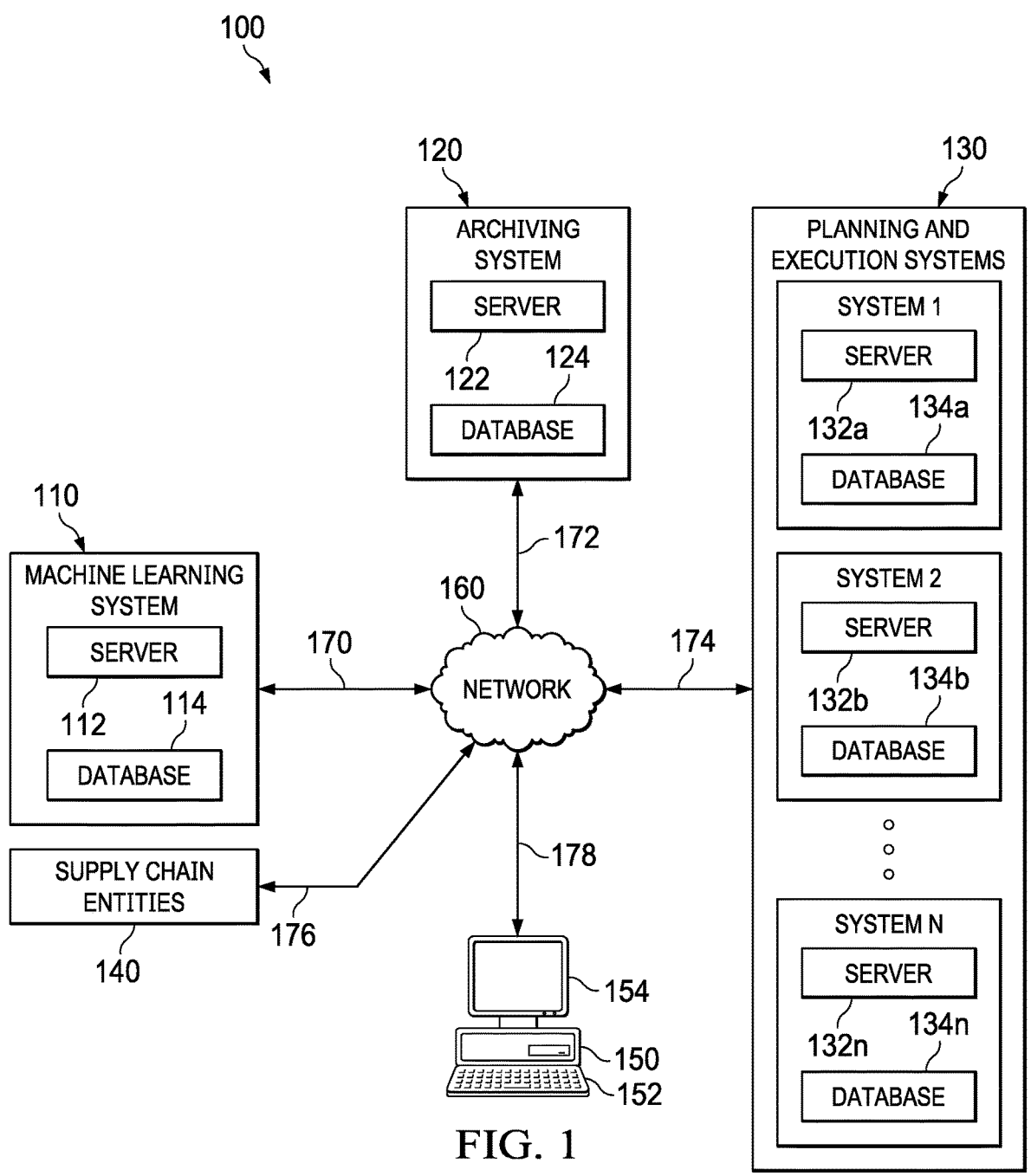
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide a machine learning system and method that generates one or more trained machine learning models that (1) utilize one or more causal factors X and historical target time series data to predict a demand volume Y (target), or (2) conduct other supply chain planning activities, including but not limited to store replenishment, using the forecasts from (1). In an embodiment, the machine learning system may use deep learning techniques to generate the one or more trained machine learning models. The machine learning system and method uses the trained machine learning models to generate one or more software agents, which for the purposes of this disclosure comprise autonomous software programs designed to execute a specific supply chain task, including but not limited to forecasting demand, planning routes, ordering replenishments, planning logistics, or executing in-store category management. Embodiments simulate a coordinated ecosystem representing a hierarchical structure of supply chain tasks and goals in which two or more software agents operate, collaborate with one another, and execute tasks (including but not limited to communicating, collaborating, and negotiating with other software agents) to optimize one or more supply chain objectives. Embodiments apply reinforcement learning to the two or more software agents operating in the simulated ecosystem to enable the software agents to better accomplish their goals within the simulated ecosystem.

Embodiments of the following disclosure provide an end-to-end network of collaborative software agents that are continuously refined via reinforcement learning techniques. The end-to-end network corresponds to decentralized, multi-agent, cooperative problem setting. Embodiments optimize software agents to execute various tasks without requiring frequent intervention from human supply chain planners. Reinforcement learning techniques optimize software agents and transform them into valuable and reliable supply chain assets that embody significant practical supply chain experience. Embodiments of reinforcement learning techniques utilize externally-created demand forecasts in reinforcement learning models.

The data used for the machine learning models may consist of several independent data sets from different retailers, distributors, or manufacturers that are subsequently used for independent training, prediction, and test runs.

FIG. 1 illustrates exemplary supply chain network 100, in accordance with a first embodiment. Supply chain network 100 comprises machine learning system 110, archiving system 120, one or more planning and execution systems 130, one or more supply chain entities 140, computer 150, network 160, and communication links 170-178. Although single machine learning system 110, single archiving system 120, one or more planning and execution systems 130, one or more supply chain entities 140, single computer 150, and single network 160 are shown and described, embodiments contemplate any number of machine learning systems 110, archiving systems 120, one or more planning and execution systems 130, one or more supply chain entities 140, computers 150, or networks 160, according to particular needs.

In one embodiment, machine learning system 110 comprises server 112 and database 114. As described in more detail below, machine learning system 110 uses a machine learning method to (1) train machine learning models to predict a demand volume Y (target) based on one or more causal factors and historical target time series data, and/or to conduct other supply chain planning activities; (2) generate one or more software agents, each of which may incorporate one or more machine learning models and may be configured to execute defined supply chain tasks within a simulated supply chain ecosystem; (3) generate a simulated supply chain ecosystem in which the software agents operate; and (4) apply reinforcement learning to the software agents to enable the software agents to better accomplish their goals within the simulated ecosystem. Machine learning system 110 may receive historical data and current data from archiving system 120, one or more planning and execution systems 130, one or more supply chain entities 140, and/or computer 150 of supply chain network 100. In addition, server 112 comprises one or more modules that provide a user interface (UI) that displays visualizations identifying and quantifying the simulated ecosystem and the actions of the software agents operating within the ecosystem.

Archiving system 120 of supply chain network 100 comprises server 122 and database 124. Although archiving system 120 is illustrated as comprising single server 122 and single database 124, embodiments contemplate any suitable number of servers or databases internal to or externally coupled with archiving system 120. Server 122 may support one or more processes for receiving and storing data from one or more planning and execution systems 130, one or more supply chain entities 140, and/or one or more computers 150 of supply chain network 100, as described in more detail herein. According to some embodiments, archiving system 120 comprises an archive of data received from one or more planning and execution systems 130, one or more supply chain entities 140, and/or one or more computers 150 of supply chain network 100. Archiving system 120 provides archived data to machine learning system 110 and/or planning and execution system 130 to, for example, train a machine learning model or generate a prediction with a trained machine learning model. Server 122 may store the received data in database 124. Database 124 may comprise one or more databases or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, and the like. Server 132 comprises one or more modules, such as, for example, a planning module, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As shown in FIG. 1, supply chain network 100 comprising machine learning system 110, archiving system 120, one or more planning and execution systems 130, and one or more supply chain entities 140 may operate on one or more computers 150 that are integral to or separate from the hardware and/or software that support machine learning system 110, archiving system 120, one or more planning and execution systems 130, and one or more supply chain entities 140. One or more computers 150 may include any suitable input device 152, such as a keypad, keyboard, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from machine learning system 110, archiving system 120, one or more planning and execution systems 130, and one or more supply chain entities 140. In addition, each of the one or more computers 150 may be a work station, personal computer 150 (PC), network computer, notebook computer, tablet, personal digital assistant (PDA), cell phone, telephone, smartphone, wireless data port, augmented or virtual reality headset, or any other suitable computing device. In an embodiment, one or more users may be associated with machine learning system 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, manufacturers, suppliers, distribution centers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Distribution centers may be any entity that organizes the shipping, stockpiling, organizing, warehousing, and distributing of one or more products. Although one example of supply chain network 100 is shown and described, embodiments contemplate any configuration of supply chain network 100, without departing from the scope described herein.

In one embodiment, machine learning system 110, archiving system 120, one or more planning and execution systems 130, supply chain entities 140, and computer 150 may be coupled with network 160 using one or more communication links 170-178, which may be any wireline, wireless, or other link suitable to support data communications between machine learning system 110, archiving system 120, planning and execution systems 130, supply chain entities 140, computer 150, and network 160 during operation of supply chain network 100. Although communication links 170-178 are shown as generally coupling machine learning system 110, archiving system 120, one or more planning and execution systems 130, one or more supply chain entities 140, and computer 150 to network 160, any of machine learning system 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling machine learning system 110, archiving system 120, one or more planning and execution systems 130, one or more supply chain entities 140, and computer 150. For example, data may be maintained locally to, or externally of, machine learning system 110, archiving system 120, one or more planning and execution systems 130, one or more supply chain entities 140, and one or more computers 150 and made available to one or more associated users of machine learning system 110, archiving system 120, one or more planning and execution systems 130, one or more supply chain entities 140, and one or more computers 150 using network 160 or in any other appropriate manner. For example, data may be maintained in a cloud database at one or more locations external to machine learning system 110, archiving system 120, one or more planning and execution systems 130, one or more supply chain entities 140, and one or more computers 150 and made available to one or more associated users of machine learning system 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Figure 2:
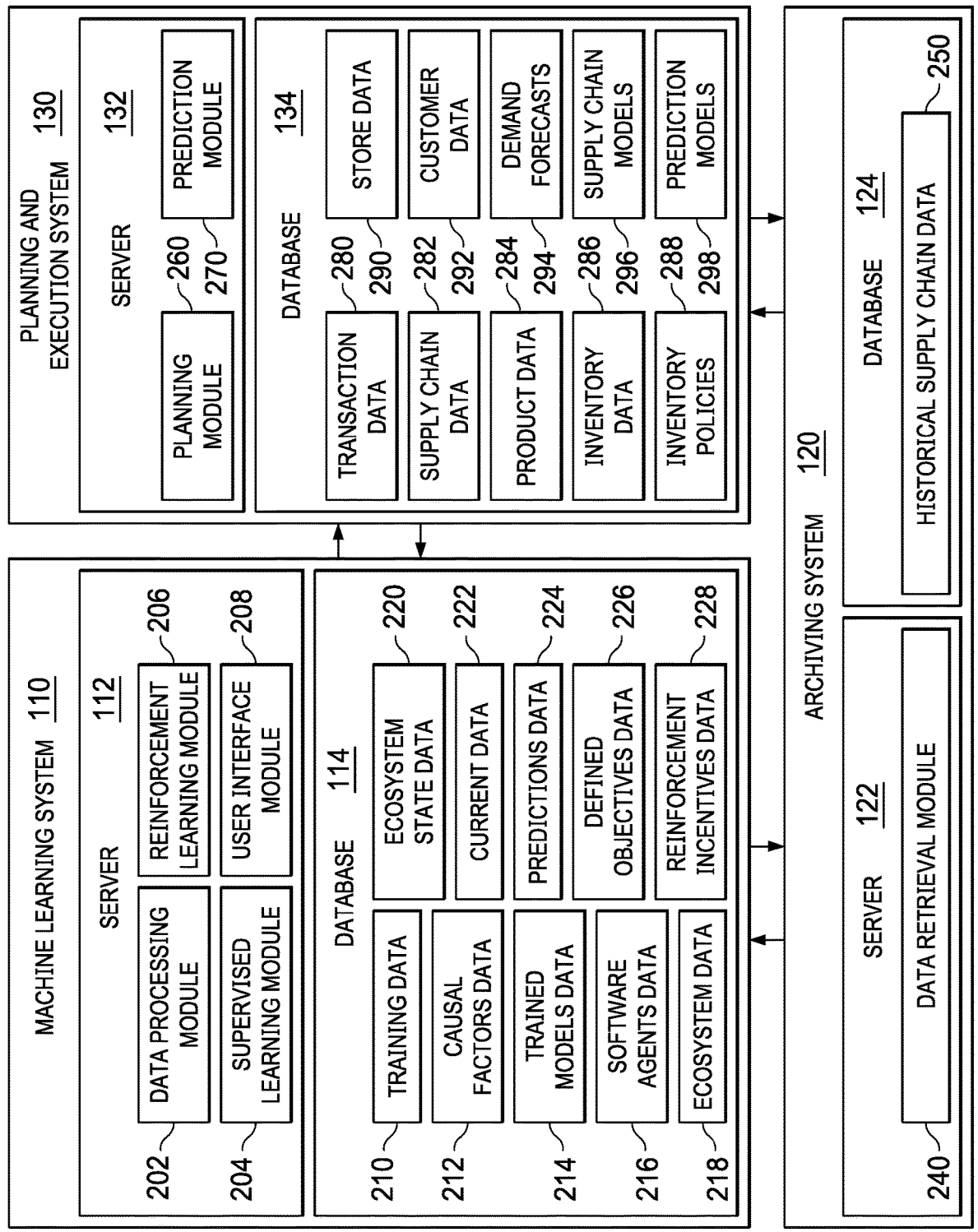
FIG. 2 illustrates the machine learning system, archiving system, and planning and execution system of FIG. 1 in greater detail, according to an embodiment.

FIG. 2 illustrates machine learning system 110, archiving system 120, and planning and execution system 130 of FIG. 1 in greater detail, in accordance with an embodiment. Machine learning system 110 may comprise server 112 and database 114, as described above. Although machine learning system 110 is illustrated as comprising single server 112 and single database 114, embodiments contemplate any suitable number of servers 112 or databases 114 internal to or externally coupled with machine learning system 110.

Server 112 comprises data processing module 202, supervised learning module 204, reinforcement learning module 206, and user interface module 208. Although server 112 is illustrated and described as comprising single data processing module 202, single supervised learning module 204, single reinforcement learning module 206, and single user interface module 208, embodiments contemplate any suitable number or combination of these located at one or more locations, local to, or remote from machine learning system 110, such as on multiple servers 112 or computers 150 at one or more locations in supply chain network 100.

Database 114 may comprise one or more databases or other data storage arrangements at one or more locations, local to, or remote from, server 112. In an embodiment, database 114 comprises training data 210, causal factors data 212, trained models data 214, software agents data 216, ecosystem data 218, ecosystem state data 220, current data 222, predictions data 224, defined objectives data 226, and reinforcement incentives data 228. Although database 114 is illustrated and described as comprising training data 210, causal factors data 212, trained models data 214, software agents data 216, ecosystem data 218, ecosystem state data 220, current data 222, predictions data 224, defined objectives data 226, and reinforcement incentives data 228, embodiments contemplate any suitable number or combination of these, located at one or more locations, local to, or remote from, machine learning system 110 according to particular needs.

In one embodiment, data processing module 202 receives data from archiving system 120, supply chain planning and execution systems 130, one or more supply chain entities 140, one or more computers 150, or one or more data storage locations local to, or remote from, supply chain network 100 and machine learning system 110, and prepares the received data for use in training the machine learning model and/or one or more trained models. Data processing module 202 prepares received data for use in training and prediction by checking received data for errors and transforming the received data. Data processing module 202 may check received data for errors in the range, sign, and/or value and use statistical analysis to check the quality or the correctness of the data. According to embodiments, data processing module 202 transforms the received data to normalize, aggregate, and/or rescale the data to allow direct comparison of received data from different supply chain entities 140 and/or planning and execution systems 130. Data processing module 202 may perform default pre-processing on the received data to prepare the received data for machine learning system 110, and/or may perform entity-specific pre-processing on data received from specific supply chain entities 140, planning and execution systems 130, or other locations in supply chain network 100.

Supervised learning module 204 uses training data 210 to train a machine learning model by identifying causal factors from historical time series data and generating the trained models. Supervised learning module 204 may, for example, train a machine learning model to predict one or more demand volumes for one or more product/location/date combinations using the causal factors stored in causal factors data 212 and/or historical target time series data stored in training data 210. In an embodiment, supervised learning module 204 may use a cyclic boosting process to train a machine learning model to predict one or more demand volumes. According to embodiments, supervised learning module 204 may use any inputs to train one or more machine learning models to conduct one or more supply chain tasks, including but not limited to forecasting demand, planning routes, ordering replenishments, planning logistics, or executing in-store category management. By way of example only and not by way of limitation, exemplary supply chain tasks include store order optimization using demand forecasts 294 of retail sales, distribution center supply forecasting using demand forecasts 294 of store orders, and/or demand shaping, including the optimization of prices, sales promotions, or other variables to shape demand for one or more products. In an embodiment, supervised learning module 204 may use deep learning techniques to generate the one or more trained machine learning models. Supervised learning module 204 stores the one or more trained models in trained models data 214.

Reinforcement learning module 206 may generate one or more software agents and a simulated ecosystem, representing a hierarchical structure of supply chain tasks and goals, in which two or more software agents operate and execute tasks. Reinforcement learning module 206 reviews the actions of the software agents as the software agents interact with one another in the ecosystem. Reinforcement learning module 206 positively reinforces the software agents that correctly perform their tasks in the ecosystem. Reinforcement learning module 206 negatively reinforces the software agents that do not correctly perform their tasks in the ecosystem.

By way of example only and not by way of limitation, in an embodiment that comprises three software agents (in this example, a store replenishment planner software agent, a distribution center planner software agent, and a production planner software agent), reinforcement learning module 206 may generate a simulated ecosystem and ecosystem state in which the store replenishment planner software agent uses demand forecasts 294 from supervised learning module 204 for the product units expected to be sold at a particular store on a particular day. In addition to the forecasted demand, the store replenishment planner software agent determines how many product units are currently in-stock at the particular store and checks for any corresponding open orders and next order opportunities. The store replenishment planner software requests replenishment from the distribution center planner software agent. In response, and under consideration of other state variables (such as, for example, inventory in the distribution center, demand forecasts 294 for future orders from stores predicted by supervised learning module 204, and orders from other retail stores or store replenishment planner software agents), the distribution center planner ships a given number of product units to the corresponding retail store and requests replenishment from the production planner software agent. In response, and under consideration of other state variables (including but not limited to demand forecasts 294 for future orders from distribution centers predicted by supervised learning module 204), the production planner software agent produces additional product units for transport to the distribution center. This example is provided for illustration purposes only, and embodiments contemplate reinforcement learning module 206 generating any form of simulated ecosystem in which any number of software agents interact with one another to perform tasks and receive positive or negative reinforcement, according to particular needs.

User interface module 208 of machine learning system 110 generates and displays a user interface (UI), such as, for example, a graphical user interface (GUI), that displays one or more interactive visualizations of trained models, software agents, and/or simulated ecosystems. According to embodiments, user interface module 208 displays a GUI comprising interactive graphical elements for selecting one or more items, stores, or products and, in response to the selection, displaying one or more graphical elements identifying one or more causal factors and/or the relative importance of the one or more causal factors to estimated demand predictions. Further, user interface module 208 may display interactive graphical elements provided for modifying simulated ecosystem defined objectives.

Training data 210 of machine learning system 110 database 114 comprises a selection of one or more periods of historical supply chain data 250 aggregated or disaggregated at various levels of granularity and presented to the machine learning model to generate trained models. According to one embodiment, training data 210 comprises historic sales patterns, prices, promotions, weather conditions, and other factors influencing future demand of a particular item sold in a given store on a specific day. Training data 210 may also comprise time series data, such as, for example, a list of products sold at various locations or retailers at recorded dates and times. As described in more detail below, machine learning system 110 may receive training data 210 from archiving system 120, one or supply chain planning and execution systems 130, one or more supply chain entities 140, computer 150, or one or more data storage locations local to, or remote from, supply chain network 100 and machine learning system 110.

Causal factors data 212 comprises one or more causal factors identified by supervised learning module 204 in the process of training the machine learning model and/or generating the one or more trained models. For the purposes of training the machine learning model and/or one or more trained models, causal factors represent exterior factors that may positively or negatively influence the sales of one or more items over one or more time periods and/or on one or more dates. As an example only and not by way of limitation, a causal factor may comprise a "Black Friday" sales day, on which, traditionally, American shoppers predictably shop and spend at a far higher rate than other sales days. Supervised learning module 204 may identify the "Black Friday" sales pattern in training data 210 by identifying that the day after "Thanksgiving Day" results in very high customer shopping and spending rates, and may store the "Black Friday" sales pattern as a causal factor in causal factors data 212.

According to embodiments, causal factors may comprise, for example, any exterior factor that positively or negatively influences the sales of one or more items over one or more time periods, such as: sales promotions, sales coupons, sales days, sales bundles, traditional heavy shopping days (such as but not limited to "Black Friday"), weather events (such as, for example, a heavy storm raining out roads, decreasing customer traffic and subsequent sales), political events (such as, for example, tax refunds increasing disposable customer income, or trade tariffs increasing the price of imported goods), and/or the day of the week (as a causal factor and not as lagged target time series information), or other factors influencing sales. In an embodiment, causal factors may occur on the day of the target volume to be predicted in a horizon-independent manner. For example, in an embodiment in which a trained model predicts, on Nov. 1, 2019, a sales volume Y that will occur on "Black Friday," Nov. 29, 2019, the trained model may utilize the "Black Friday" causal factor to predict sales on Nov. 29, 2019, even though the "Black Friday" causal factor has not yet occurred on the Nov. 1, 2019 date of the prediction.

Trained models data 214 comprises one or more machine learning models trained by supervised learning module 204 to (1) utilize one or more causal factors X and historical target time series data to predict a demand volume Y (target), or (2) conduct other supply chain planning activities, including but not limited to optimizing store orders using retail sales forecasts, distribution center supply forecasting using demand forecasts 294 of store orders, and/or demand shaping, including the optimization of prices, sales promotions, or other variables to shape demand for one or more products.

Software agents data 216 comprises one or more software agents trained by reinforcement learning module 206. Each software agents comprises an autonomous software program that incorporates one or more of the trained models to execute a specific supply chain task within a simulated ecosystem. By way of example only and not by way of limitation, exemplary software agents include distribution planners, route planners, replenishment planners, packaging & assembly planners, production planners, logistics planners, and in-store category managers. Each software agent may be configured to operate in a simulated ecosystem of other software agents and to communicate and collaborate with, execute orders from, and modify other software agents operating within the simulated ecosystem. In an embodiment, each software agent is configured to incorporate reinforcement learning feedback issued by reinforcement learning module 206 in the form of positive reinforcement incentives (issued when the software agent successfully completes its supply chain task) and negative reinforcement incentives (issued when the software agent does not successfully complete its supply chain task) and may be considered an independent learner.

Ecosystem data 218 comprises data related to the simulated supply chain ecosystem, generated by reinforcement learning module 206, within which the software agents interact with one another. The simulated supply chain ecosystem may simulate an entire supply chain, including all necessary inputs, materials, transportation mechanisms, costs, outputs, desired goals, and other variables, and may allow software agents to interact with one another to place orders, shipments, receive simulated deliveries, and execute any other supply chain tasks. In an embodiment, the simulated ecosystem provides a simulated environment in which reinforcement learning module 206 provides the software agents with a supply chain state/situation and can learn what impact the actions of the software agents have on the future state of the simulated environment. The simulated ecosystem allows software agents to experience trillions of states and actions, enabling the software agents to learn which actions to apply to achieve the best outcome for the current and future supply chain state.

Ecosystem state data 220 comprises data regarding a plurality of individual states of simulated ecosystem supply chain components. By way of example only and not by way of limitation, in an embodiment, a simple simulated ecosystem may comprise one supply chain manufacturer and one supply chain retailer. One ecosystem state may comprise the supply chain manufacturer beginning the simulation with a fully supply of manufacturing inputs with which the supply chain manufacturer can meet its manufacturing goals, and another ecosystem state may comprise the supply chain manufacturer beginning the simulation missing key manufacturing inputs that will prevent the supply chain manufacturer from achieving its goals. Embodiments may contemplate trillions of individual ecosystem states for each simulated ecosystem, simulating any manner of supply chain conditions, available resources, inputs, or outputs.

Current data 222 comprises data used by the one or more trained models to generate a predicted demand for one or more product/location/date combinations. According to embodiments, current data 222 comprises current sales patterns, prices, promotions, weather conditions, and other current factors influencing demand of a particular product sold in a given store location on a specific day. One or more trained models may access current data 222, output a predicted demand for one or more product/location/date combinations, and store the predicted demand in predictions data 224. According to embodiments, predictions data 224 comprises one or more predicted demands or outputs generated by the one or more trained models.

Defined objectives data 226 comprise one or more supply chain objectives, selected by user interface module 208 and/or reinforcement learning module 206, which the software agents will attempt to achieve within the simulated supply chain ecosystem. Reinforcement incentives data 228 comprises positive reinforcement incentives and negative reinforcement incentives that reinforcement learning module 206 may use to modify the behavior of the software agents to better align the activities of the software agents with the simulated ecosystem defined objectives.

As described above, archiving system 120 comprises server 122 and database 124. Although archiving system 120 is illustrated as comprising single server 122 and single database 124, embodiments contemplate any suitable number of servers or databases internal to or externally coupled with archiving system 120.

Server 122 comprises data retrieval module 240. Although server 122 is illustrated and described as comprising single data retrieval module 240, embodiments contemplate any suitable number or combination of data retrieval modules 240 and/or other modules located at one or more locations, local to, or remote from archiving system 120, such as on multiple servers 122 or computers 150 at one or more locations in supply chain network 100.

In one embodiment, data retrieval module 240 receives historical supply chain data 250 from one or more supply chain planning and execution systems 130 and one or more supply chain entities 140, and stores the received historical supply chain data 250 in database 124. According to one embodiment, data retrieval module 240 may prepare historical supply chain data 250 for use as training data 210 of machine learning system 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like, and stores the received data as historical supply chain data 250.

Database 124 may comprise one or more databases or other data storage arrangements at one or more locations, local to, or remote from, server 122. Database 124 comprises, for example, historical supply chain data 250. Although database 124 is illustrated and described as comprising historical supply chain data 250, embodiments contemplate any suitable number or combination of data, located at one or more locations, local to, or remote from, archiving system 120, according to particular needs.

Historical supply chain data 250 comprises historical data received from machine learning system 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, planning and execution system 130 comprises server 132 and database 134. Although planning and execution system 130 is illustrated as comprising single server 132 and single database 134, embodiments contemplate any suitable number of servers 132 or databases 134 internal to or externally coupled with planning and execution system 130.

Server 132 comprises planning module 260 and prediction module 270. Although server 132 is illustrated and described as comprising single planning module 260 and single prediction module 270, embodiments contemplate any suitable number or combination of planning modules 260 and prediction modules 270 located at one or more locations, local to, or remote from planning and execution system 130, such as on multiple servers 132 or computers 150 at one or more locations in supply chain network 100.

Database 134 may comprise one or more databases 134 or other data storage arrangements at one or more locations, local to, or remote from, server 132. Database 134 comprises, for example, transaction data 280, supply chain data 282, product data 284, inventory data 286, inventory policies 288, store data 290, customer data 292, demand forecasts 294, supply chain models 296, and prediction models 298. Although database 134 is illustrated and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 260 works in connection with prediction module 270 to generate a plan based on one or more predicted retail volumes, classifications, or other predictions. By way of example and not of limitation, planning module 260 may comprise a demand planner that generates a demand forecast for one or more supply chain entities 140. Planning module 260 may generate the demand forecast, at least in part, from predictions and calculated factor values for one or more causal factors received from prediction module 270. By way of a further example, planning module 260 may comprises an assortment planner and/or a segmentation planner that generates product assortments that match causal effects calculated for one or more customers or products by prediction module 270, which may provide for increased customer satisfaction and sales, as well as reducing costs for shipping and stocking products at stores where they are unlikely to sell.

Prediction module 270 applies samples of transaction data 280, supply chain data 282, product data 284, inventory data 286, store data 290, customer data 292, demand forecasts 294, and other data to prediction models 298 to generate predictions and calculated factor values for one or more causal factors. According to embodiments, prediction module 270 may predict a volume Y (target or label) from a set of causal factors X along with causal factors strengths that describe the strength of each causal factor variable contributing to the predicted volume. According to some embodiments, prediction module 270 generates predictions at daily intervals. However, embodiments contemplate longer and shorter prediction phases that may be performed, for example, weekly, twice a week, twice a day, hourly, or the like.

Transaction data 280 of database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of machine learning system 110.

Inventory policies 288 may comprise any suitable inventory policy describing the reorder point and target quantity, or other inventory policy parameters that set rules for machine learning system 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a certain probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, machine learning system 110 and/or planning and execution system 130 may determine a replenishment order according to one or more replenishment rules, which, among other things, indicates to one or more supply chain entities 140 to determine or receive inventory to replace the depleted inventory. As an example only and not by way of limitation, an inventory policy for non-perishable goods with linear holding and shorting costs comprises a min./max. (s, S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Inventory policies 288 described above may also be replaced by an inventory policy expressed by a software agent that was trained by the supervised and reinforcement learning modules 206.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According to other embodiments, the model also takes into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example only and not by way of limitation, an exemplary supermarket may stock twenty thousand items at one thousand locations. If each location of this exemplary supermarket is open every day of the year, planning and execution system 130 comprising a demand planner would need to calculate approximately $2 \times 10^{10}$ demand forecasts 294 each day to derive the optimal order volume for the next delivery cycle (e.g. three days).

Hereby, demand is defined differently for the different stages of the supply chain. For a retail store demand is manifested in the sales to the end-consumer, while for a distribution center demand is defined as orders from the retail stores assigned to it.

Supply chain models 296 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model.

Prediction models 298 comprise one or more of the modified models used by planning and execution system 130 for predicting a retail volume, such as, for example, a forecasted demand volume for one or more items at one or more stores of one or more retailers.

Figure 3:
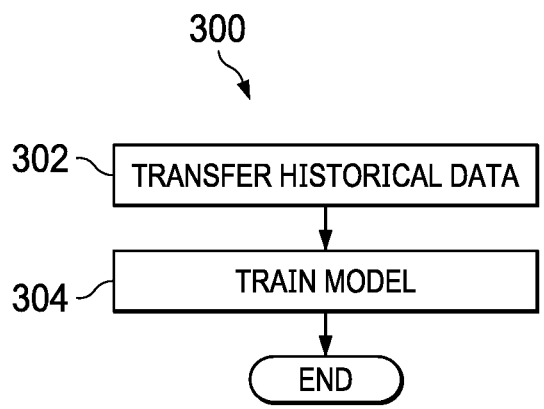
FIG. 3 illustrates an exemplary method of training a supervised machine learning model, according to an embodiment.

FIG. 3 illustrates exemplary method 300 of training a supervised machine learning model, according to an embodiment. Method 300 proceeds by one or more actions, which although described in a particular order, may be performed in one or more permutations, according to particular needs.

At action 302, data processing module 202 of machine learning system 110 server 112 transfers historical data from archiving system 120, and/or transaction data 280, supply chain data 282, product data 284, inventory data 286, store data 290, and/or customer data 292 from one or more planning and execution systems 130, into training data 210 of machine learning system 110 database 114. In other embodiments, data retrieval module 240 of archiving system 120 may transfer historical supply chain data 250 from archiving system 120 to training data 210 of machine learning system 110 database 114. The historical data may consist of several independent data sets, for example from different retailers that are subsequently used for independent training, prediction, and test runs. Data processing module 202 may perform default pre-processing on the received data to transfer the received data into training data 210, and/or may perform entity-specific pre-processing on data received from specific supply chain entities 140, planning and execution systems 130, or other locations in supply chain network 100.

At action 304, supervised learning module 204 generates one or more trained models using training data 210. In an embodiment, supervised learning module 204 accesses training data 210 and one or more specified product/location/date combinations that may be stored therein, and uses training data 210 to train the machine learning model and generate one or more trained models by identifying, from training data 210, one or more causal factors as well as the strengths with which each of the one or more causal factors contributes to the predicted demand volume of the one or more trained models. In other embodiments, supervised learning module 204 may use any inputs to train one or more machine learning models to conduct any supply chain tasks, including but not limited to forecasting demand, planning routes, ordering replenishments, planning logistics, distribution center supply forecasting using demand forecasts 294 of store orders, and/or demand shaping, including the optimization of prices, sales promotions, or other variables to shape demand for one or more products. According to embodiments, supervised learning module 204 may use any machine learning process, including but not limited to a cyclic boosting process, to identify one or more causal factors, train the machine learning model, and/or generate one or more trained models. Supervised learning module 204 identifies causal factors and stores the causal factors in causal factors data 212. Supervised learning module 204 stores the one or more trained models in trained models data 214, and terminates method 300.

Besides performing demand forecasts 294 for the different stages of the supply chain, such as sales in a retail store or orders from retailers to a distribution center, method 300 may also train models to directly predict actions or action values of a supply chain planner for a given state of the environment, where the supply chain planner can be a human being, an optimization algorithm, or a software agent, and the environment can be a real supply chain or a simulated ecosystem. An example for an action is the placement of an order from a retail store to a distribution center and such an action is an implication of a given ordering policy. In this example, embodiments of method 300 may learn an approximate representation of the ordering policy by using past or simulated data and considering the taken actions as target values and the variables describing the state of the environment at the time the action is taken as features. As an alternative to such a policy learning, method 300 may approximate a value function, which may be referred to as Q, for a given action, again by considering the variables describing the state of the environment at the time the action is taken as features. Hereby, the Q-values used as target of the supervised learning model represent the sum of the immediate and delayed future reward of the considered action, which can be measured from the response of the environment to the action, where usually only the immediate response to the current action is measured and the future responses after subsequent actions are approximated by the Q-value of the next state. In this embodiment, function approximation, as performed by method 300s, is crucial because supply chains usually represent very large state and action spaces that cannot be handled by tabular methods due to computational complexity and missing information for the majority of states. According to embodiments, any supervised machine learning algorithm may be used for learning the action policy or Q-values. In an embodiment, deep learning methods may be an appropriate choice because of the ability of deep learning methods to approximate flexible, non-linear functions. With regard to demand forecasting, it is beneficial, both for computational purposes and generalization capabilities, to include many item-store, or more general product-location, combinations in training data 210 set of the supervised learning model, although the decision-making is done separately for each item-store combination.

Figure 4:
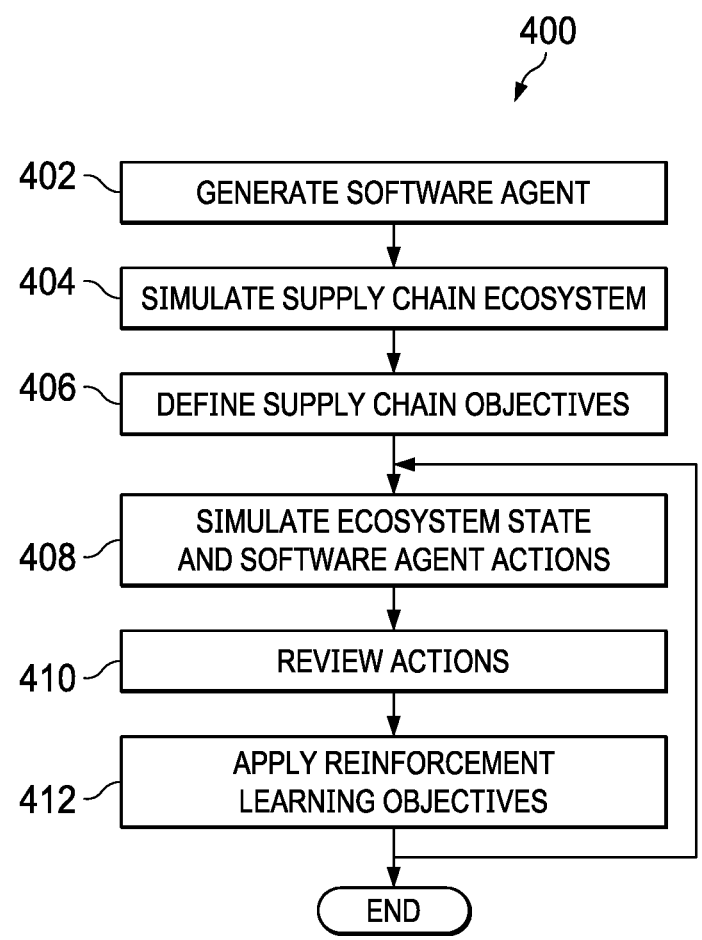
FIG. 4 illustrates an exemplary method to train software agents to accomplish goals in a simulated ecosystem using reinforcement learning techniques, according to an embodiment.

FIG. 4 illustrates exemplary method 400 to train software agents to accomplish goals in a simulated ecosystem using reinforcement learning techniques, according to an embodiment. Compared to "hand-crafting" one or more software agents to generate outputs in compliance with initial goals, method 400 optimizes all software agents in a "hands-off" end-to-end simulated supply chain ecosystem in which each software agent interacts with other software agents and attempt to optimize its actions according to one or more defined objectives. The different software agents may be considered as independent learners that strive for the minimization of the long-run, system-wide costs, which corresponds to a decentralized, multi-agent, cooperative problem. Method 400 proceeds by one or more actions, which although described in a particular order, may be performed in one or more permutations, according to particular needs.

At action 402, reinforcement learning module 206 generates one or more software agents. Reinforcement learning module 206 accesses the trained models stored in trained models data 214 and generates one or more software agents. Each software agent may comprise one or more trained models configured to perform tasks in supply chain network 100. Reinforcement learning module 206 may use any trained models to generate software agents to conduct any supply chain tasks, including but not limited to forecasting demand, planning routes, ordering replenishments, planning logistics, or executing in-store category management. Reinforcement learning module 206 stores the one or more software agents in software agents data 216 of database 114.

At action 404, reinforcement learning module 206 generates a simulated supply chain ecosystem in which the software agents will carry out actions in various simulated supply chain states. The actions taken by the software agents in a given state of the supply chain are defined by the policy or Q-values, for which the software agents choose the possible action with the highest Q-value, learned by corresponding method 300. However, in order to enable exploration of previously unobserved states and actions, a small fraction of actions may be taken randomly, for example following an epsilon-greedy approach. Reinforcement learning module 206 may access any supply chain data stored in archiving system 120 database 124 and/or planning and execution system 130 database 134 to access supply chain parameters (including but not limited to supply chain size, participating entities, inputs, materials, transportation mechanisms, costs, outputs, desired goals, and/or other supply chain variables). Reinforcement learning module 206 may model the supply chain parameters in the simulated supply chain ecosystem. The simulated ecosystem provides a simulated environment in which reinforcement learning module 206 provides the software agents with a supply chain state or scenario. Reinforcement learning module 206 stores the simulated ecosystem in ecosystem data 218 of machine learning system 110 database 114.

At action 406, reinforcement learning module 206 defines the supply chain objectives that the software agents operating in the simulated ecosystem will attempt to fulfill. In an embodiment, reinforcement learning module 206 accesses defined objectives stored in defined objectives data 226 of database 114. According to embodiments, reinforcement learning module 206 may choose other defined objectives for different simulated ecosystem states, thereby testing the performance of the software agents in various supply chain scenarios.

At action 408, reinforcement learning module 206 simulates the actions of the participating software agents according to a particular ecosystem state. Reinforcement learning module 206 accesses ecosystem state data 220, specifying the specific details of the ecosystem state (such as, for example, the resources available for each supply chain manufacturer in the simulated ecosystem), stored in machine learning system 110 database 114. Reinforcement learning module 206 then simulates the actions of each software agent in operation within the simulated ecosystem (such as, for example, manufacturing planners setting product manufacturing at specific levels based on the resources available for each supply chain manufacturer in the particular simulated ecosystem state). Reinforcement learning module 206 calculates the effects of the actions of each software agent, and stores the new simulated ecosystem state in ecosystem state data 220.

At action 410, reinforcement learning module 206 reviews the actions of the software agents. Reinforcement learning module 206 compares the new simulated ecosystem state to the defined objectives stored in defined objectives data 226 to determine the degree to which each of the software agents accomplished its goal. For example, the goal may be the measurement of out-of-stock situations or waste of perishable goods in a supermarket following the ordering policy of a store replenishment planner software agent.

At action 412, reinforcement learning module 206 applies positive or negative reinforcement incentives to each software agent according to the degree to which the software agent accomplished its goal in the given ecosystem state. Reinforcement learning module 206 accesses reinforcement incentives stored in reinforcement incentives data 228 of machine learning system 110 database 114. Reinforcement learning module 206 rewards software agents that successfully completed their objectives with positive, or less negative, reinforcement. Reinforcement learning module 206 applies negative reinforcement to the software agents that did not successfully complete their objectives to compel the unsuccessful software agents to take alternative actions in the next simulated ecosystem state.

Method 400 returns to action 408, simulates a new supply chain ecosystem state, and continues to execute actions 408, 410, and 412 of method 400 to continuously optimize the software agents to perform their tasks. Method 400 provides continuous, end-to-end optimization of the simulated supply chain ecosystem, and "no-touch" refinement and optimization of the software agents operating within the simulated ecosystem. Reinforcement learning module 206 then terminates method 400.

In an embodiment, two possible approaches for performing reinforcement learning in the supply chain, in combination with deep learning for function approximation in large state and action spaces, are policy-gradient methods and deep Q-learning. Policy-gradient methods weight the gradients of the parameters in a neural network, learned to represent some action policy, by the rewards, potentially discounted for subsequent actions, following the response of the supply chain to the given action. In principle, this method can be used with real data only, i.e. without a simulation of the supply chain, as the starting policy can be chosen as a productive "hand-crafted" policy. Deep Q-learning uses a deep neural network to approximate the Q-value functions, with the Q-value as output for any possible state-action pair. The two approaches of policy-gradient and Q-learning can also be combined in actor-critic methods, where the Q-values are used as critic of the policy.

To illustrate the operation of machine learning system 110 generating software agents by means of supervised learning model training techniques and then optimizing the software agents via reinforcement learning techniques in a simulated ecosystem, the following example is provided. In this example, machine learning system 110 generates three software agents (a replenishment planner, a production planner, and a route planner) and then optimizes the software agents via reinforcement learning in a plurality of simulated ecosystem states. Although particular examples of machine learning system 110, trained models, software agents, and simulated ecosystems are illustrated and described herein, embodiments contemplate machine learning system 110 executing the actions of the above-described methods to train any machine learning models, generate any software agents, and generate any simulated ecosystems, according to particular needs.

In this example, and at action 302, data processing module 202 of machine learning system 110 server 112 transfers historical product sales data, comprising product sales data from a plurality of supply chain entities 140 and planning and execution systems 130, from archiving system 120 into training data 210 of machine learning system 110 database 114.

Continuing the example, at action 304, supervised learning module 204 first generates a trained demand forecasting model using training data 210. In this example, supervised learning module 204 accesses training data 210 and uses training data 210 to train the machine learning model and generate a trained model by identifying, from training data 210, one or more causal factors as well as the strengths with which each of the one or more causal factors contributes to the predicted demand output of the trained model. In this example, supervised learning module 204 uses a machine learning cyclic boosting process to identify one or more causal factors, train the machine learning model, and generate trained models. Supervised learning module 204 identifies causal factors and stores the causal factors in causal factors data 212. Supervised learning module 204 stores the demand forecasting model in trained models data 214 and creates demand forecasts 294 to be subsequently used in the replenishment planning model. Supervised learning module 204 generates three additional trained models (in this example, a replenishment planning model, a production planning model, and a route planning model) using training data 210. In this example, supervised learning module 204 uses deep learning, in the form of neural networks with multiple hidden layers, to approximate non-linear functions as representations of policy decisions and to create the replenishment planning model, production planning model, and route planning model. Supervised learning module 204 stores the replenishment planning model, the production planning model, and the route planning model in trained models data 214, and terminates method 300.

Continuing the example, at action 402, reinforcement learning module 206 generates software agents. Reinforcement learning module 206 accesses the replenishment planning model stored in trained models data 214 and generates a replenishment planning software agent. Similarly, reinforcement learning module 206 accesses the production planning model and the route planning model, and generates a production planning software agent and a route planning software agent. Reinforcement learning module 206 stores the replenishment planning, production planning, and route planning software agents in software agents data 216 of database 114.

Continuing the example, at action 404, reinforcement learning module 206 generates a simulated supply chain ecosystem in which the replenishment planning, production planning, and route planning software agents will carry out actions in various simulated supply chain states. Reinforcement learning module 206 accesses supply chain data 282 stored in archiving system 120 database 124 and planning and execution system 130 database 134 to access supply chain parameters (including but not limited to supply chain size, participating entities, inputs, materials, transportation mechanisms, costs, outputs, desired goals, and/or other supply chain variables), which reinforcement learning module 206 models in the simulated supply chain ecosystem. Reinforcement learning module 206 stores the simulated ecosystem in ecosystem data 218 of machine learning system 110 database 114.

Continuing the example, at action 406, reinforcement learning module 206 defines the supply chain objectives that the software agents operating in the simulated ecosystem will attempt to fulfill. In this example, reinforcement learning module 206 accesses defined objectives stored in defined objectives data 226 of database 114. The defined objectives in this example comprise: (1) all understocked items must be produced and replenished; (2) production should minimize rush orders to reduce overtime; and (3) routes should be as efficient as possible, without impacting the previous two defined objectives.

Continuing the example, at action 408, reinforcement learning module 206 calculates the actions of the participating software agents according to a particular ecosystem state. Reinforcement learning module 206 accesses ecosystem state data 220, specifying the specific details of the ecosystem state (such as, for example, the resources available for each supply chain manufacturer in the simulated ecosystem), stored in machine learning system 110 database 114. Reinforcement learning module 206 then simulates the actions of each software agent in operation within the simulated ecosystem. In this example, reinforcement learning module 206 simulates a particular ecosystem state in which all simulated supply chain entities 140 within the simulated ecosystem are understocked. In this example, the replenishment planning software agent collaborates with the production planning software agent and route planning software agent to produce and ship rush orders of replacement stocking items to address the understocked supply chain entities 140. Reinforcement learning module 206 calculates the effects of the actions of each software agent, and stores the new simulated ecosystem state in ecosystem state data 220.

Continuing the example, and at action 410, reinforcement learning module 206 reviews the actions of the software agents. Reinforcement learning module 206 compares the new simulated ecosystem state to the defined objectives to determine the degree to which each of the software agents accomplished its goal. In this example, reinforcement learning module 206 determines that the software agents restocked all understocked items and planned efficient routes while doing so, but did have to execute rush production orders to produce replacement stocking items.

Continuing the example, and at action 412, reinforcement learning module 206 applies positive or negative reinforcement incentives to each software agent according to the degree to which the software agent accomplished its goal in the given ecosystem state. In this example, reinforcement learning module 206 accesses reinforcement incentives stored in reinforcement incentives data 228 of machine learning system 110 database 114, and positively rewards the replenishment planning and route planning software agents that successfully completed their objectives. Reinforcement learning module 206 applied negative reinforcement to the production planning software agents that did not successfully complete its objective (minimizing rush orders) in this particular ecosystem state.

Concluding with this example, method 400 returns to action 408, simulates a new supply chain ecosystem state, and continues to execute actions 408, 410, and 412 of method 400 to continuously optimize the software agents to perform their tasks.

By way of example only and not by way of limitation, in an embodiment, reinforcement learning module 206 may utilize the following actions to simulate a particular supply chain ecosystem state, the actions in the form of store orders of one or more store replenishment planner software agents in response to the particular ecosystem state, and the rewards given to the software agents in response to their actions. In this example, order possibilities are constrained to given days, e.g. on days $t_0$, $t_1$, $t_4$, and so on. Reinforcement learning module 206 may start with a given stock level for a given product-location combination on day $t_0$. Reinforcement learning module 206 may simulate corresponding demand for the upcoming day $t_1$ by means of sampling from individual probability density functions of demand forecasts 294 (e.g. negative binomial distributions). Reinforcement learning module 206 may independently simulate demand for following days $t_2$, $t_3$, and so on. A software agent may place an order (action 1) at to $t_0$ arrive on a subsequently following day, such as $t_2$. Reinforcement learning module 206 may simulate supply fulfillment of the order decision and of other potential outstanding past orders. Reinforcement learning module 206 may calculate stock level at $t_1$, $t_2$ from starting stock level at to, simulated demand and supply fulfilment. A software agent may place an order (action 2) at $t_1$ to arrive, for example, on day $t_3$, and so on. Reinforcement learning module 206 may calculate a reward (in this example, always <=0) in terms of costs for lost sale (unfulfilled demand in the case of out of stock) and inventory (stocks) for each day. The immediate reward of an action is the sum of the daily rewards for the days between arrival of the given order and arrival of the next order, which is the action at the next order opportunity.

The state variables of the supply chain environment are used as features of the policy or Q-value supervised learning models. For the example of store replenishment, the state variables include demand forecasts 294 for a time range to cover at least the days until the arrival of the next order, upcoming expected deliveries, next order opportunities, and the current stock level, where the fact that only the current stock is considered reflects the Markov property of the process. A collaboration with other autonomous software agents of the given supply chain is achieved via taking into account the corresponding supply answers to previously placed orders in form of received shipments during the reinforcement learning process.

Using demand forecasts 294 for the near future as features of the policy or Q-value supervised learning models, rather than mere past observations of demand in recent days, has the advantage of accounting for known upcoming effects, including but not limited to the start of a promotion or a holiday. The use of externally determined demand forecasts 294 is, in first order, justified by the assumption that demand is unaffected by the order decisions and has the additional advantage of a reduction of training complexity for the replenishment planner software agent compared with a model jointly performing both tasks of demand forecasting and policy or Q-value estimation, while allowing to use a dedicated approach to achieve best possible demand forecasts 294.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A computer-implemented method, comprising:
    training, by a computer comprising a processor and memory, one or more machine learning models of a Markov-based reinforcement learning process;
    generating, with the one or more machine learning models, a first software agent and a second software agent, wherein each of the one or more software agents comprises an autonomous software program designed to execute one or more tasks in a supply chain network;
    generating, by the computer, a simulated supply chain ecosystem representing a hierarchical structure of supply chain network tasks;
    simulating, by the computer, the one or more tasks executed by the first software agent and the second software agent in the simulated supply chain ecosystem, wherein decisions by the first software agent and the second software agent to execute the one or more tasks in the simulated supply chain ecosystem are made according to the Markov-based reinforcement learning process and at least partially based on an epsilon-greedy approach;
    reviewing, by the computer, the one or more tasks executed by the first software agent and the second software agent according to one or more defined objectives; and
    applying, by the computer, reinforcement incentives to the first software agent and the second software agent, based at least in part on achievement of the one or more defined objectives.

2. The computer-implemented method of claim 1, further comprising, after applying reinforcement incentives to the first software agent and the second software agent:
    generating, by the computer, an updated simulated supply chain ecosystem representing a hierarchical structure of supply chain network tasks;
    simulating, by the computer, one or more updated tasks executed by the first software agent and the second software agent in the updated simulated supply chain ecosystem;
    reviewing, by the computer, the one or more updated tasks executed by the first software agent and the second software agent according to the one or more defined objectives; and
    applying, by the computer, updated reinforcement incentives to the first software agent and the second software agent, based at least in part on the degree to which the updated tasks executed by the first software agent and the second software agent achieved the one or more defined objectives.

3. The computer-implemented method of claim 1, further comprising:
    generating, with the one or more machine learning models, a first software agent designed to execute a task in the supply chain network by selecting and executing one or more actions associated with a highest available Q-value, wherein the Q-value represents a sum of an immediate reward and delayed future rewards of the associated action.

4. The computer-implemented method of claim 1, further comprising the computer generating the reinforcement incentives using one or more policy-gradient methods, wherein the one or more policy-gradient methods comprise, at least in part, a gradient of parameters generated by a neural network.

5. The computer-implemented method of claim 1, wherein at least one of the first software agent and the second software agent comprises a software agent selected from a group consisting of:
    a distribution planner software agent;
    a route planner software agent;
    a replenishment planner software agent;
    a packaging and assembly planner software agent;
    a production planner software agent;
    a logistics planner software agent; and
    an in-store category manager software agent.

6. The computer-implemented method of claim 1, wherein the one or more machine learning models generates a first software agent and a second software agent using demand forecasts.

7. The computer-implemented method of claim 1, wherein the simulated supply chain ecosystem comprises an end-to-end simulated ecosystem in which the first software agent and the second software agent interact with one another while executing tasks.

8. A system comprising a computer, the computer comprising a processor and memory and configured to:
    train one or more machine learning models of a Markov-based reinforcement learning process;
    generate, with the one or more machine learning models, a first software agent and a second software agent, wherein each of the one or more software agents comprises an autonomous software program designed to execute one or more tasks in a supply chain network;
generate a simulated supply chain ecosystem representing a hierarchical structure of supply chain network tasks;
simulate the one or more tasks executed by the first software agent and the second software agent in the simulated supply chain ecosystem, wherein decisions by the first software agent and the second software agent to execute the one or more tasks in the simulated supply chain ecosystem are made according to the Markov-based reinforcement learning process and at least partially based on an epsilon-greedy approach;
review the one or more tasks executed by the first software agent and the second software agent according to one or more defined objectives; and
apply reinforcement incentives to the first software agent and the second software agent, based at least in part on achievement of the one or more defined objectives.

9. The system of claim 8, further comprising the computer, after applying reinforcement incentives to the first software agent and the second software agent:
generating an updated simulated supply chain ecosystem representing a hierarchical structure of supply chain network tasks;
simulating one or more updated tasks executed by the first software agent and the second software agent in the updated simulated supply chain ecosystem;
reviewing the one or more updated tasks executed by the first software agent and the second software agent according to the one or more defined objectives; and
applying updated reinforcement incentives to the first software agent and the second software agent, based at least in part on the degree to which the updated tasks executed by the first software agent and the second software agent achieved the one or more defined objectives.

10. The system of claim 8, further comprising the computer:
generating, with the one or more machine learning models, a first software agent designed to execute a task in the supply chain network by selecting and executing one or more actions associated with a highest available Q-value, wherein the Q-value represents a sum of an immediate reward and delayed future rewards of the associated action.

11. The system of claim 8, further comprising the computer generating the reinforcement incentives using one or more policy-gradient methods, wherein the one or more policy-gradient methods comprise, at least in part, a gradient of parameters generated by a neural network.

12. The system of claim 8, wherein at least one of the first software agent and the second software agent comprises a software agent selected from a group consisting of:
a distribution planner software agent;
a route planner software agent;
a replenishment planner software agent;
a packaging and assembly planner software agent;
a production planner software agent;
a logistics planner software agent; and
an in-store category manager software agent.

13. The system of claim 8, wherein the one or more machine learning models generates a first software agent and a second software agent using demand forecasts.

14. The system of claim 8, wherein the simulated supply chain ecosystem comprises an end-to-end simulated ecosystem in which the first software agent and the second software agent interact with one another while executing tasks.

15. A non-transitory computer-readable storage medium embodied with software, the software when executed configured to:
train one or more machine learning models of a Markov-based reinforcement learning process;
generate, with the one or more machine learning models, a first software agent and a second software agent, wherein each of the one or more software agents comprises an autonomous software program designed to execute one or more tasks in a supply chain network;
generate a simulated supply chain ecosystem representing a hierarchical structure of supply chain network tasks;
simulate the one or more tasks executed by the first software agent and the second software agent in the simulated supply chain ecosystem, wherein decisions by the first software agent and the second software agent to execute the one or more tasks in the simulated supply chain ecosystem are made according to the Markov-based reinforcement learning process and at least partially based on an epsilon-greedy approach;
review the one or more tasks executed by the first software agent and the second software agent according to one or more defined objectives; and
apply reinforcement incentives to the first software agent and the second software agent, based at least in part on achievement of the one or more defined objectives.

16. The non-transitory computer-readable storage medium of claim 15, wherein the software when executed is further configured to, after applying reinforcement incentives to the first software agent and the second software agent:
generate an updated simulated supply chain ecosystem representing a hierarchical structure of supply chain network tasks;
simulate one or more updated tasks executed by the first software agent and the second software agent in the updated simulated supply chain ecosystem;
review the one or more updated tasks executed by the first software agent and the second software agent according to the one or more defined objectives; and
apply updated reinforcement incentives to the first software agent and the second software agent, based at least in part on the degree to which the updated tasks executed by the first software agent and the second software agent achieved the one or more defined objectives.

17. The non-transitory computer-readable storage medium of claim 15, wherein the software when executed is further configured to:
generate, with the one or more machine learning models, a first software agent designed to execute a task in the supply chain network by selecting and executing one or more actions associated with a highest available Q-value, wherein the Q-value represents a sum of an immediate reward and delayed future rewards of the associated action.

18. The non-transitory computer-readable storage medium of claim 15, wherein the software when executed is further configured to:
generate the reinforcement incentives using one or more policy-gradient methods, wherein the one or more policy-gradient methods comprise, at least in part, a gradient of parameters generated by a neural network.

19. The non-transitory computer-readable storage medium of claim 15, wherein at least one of the first software agent and the second software agent comprises a software agent selected from a group consisting of:

a distribution planner software agent;
a route planner software agent;
a replenishment planner software agent;
a packaging and assembly planner software agent;
a production planner software agent;
a logistics planner software agent; and
an in-store category manager software agent.

20. The non-transitory computer-readable storage medium of claim 15, wherein the one or more machine learning models generates a first software agent and a second software agent using demand forecasts.

* * * * *